(12) United States Patent
Kesavan et al.

(10) Patent No.: US 9,612,760 B2
(45) Date of Patent: Apr. 4, 2017

(54) MODULAR BLOCK-ALLOCATOR FOR DATA STORAGE SYSTEMS

(71) Applicant: NetApp, Inc., Sunnyvale, CA (US)

(72) Inventors: Ram Kesavan, Sunnyvale, CA (US); Mrinal K. Bhattacharjee, Bangalore (IN); Sudhanshu Goswami, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 2 days.

(21) Appl. No.: 14/748,995

(22) Filed: Jun. 24, 2015

(65) Prior Publication Data

US 2015/0293717 A1 Oct. 15, 2015

Related U.S. Application Data

(63) Continuation of application No. 13/334,871, filed on Dec. 22, 2011, now Pat. No. 9,122,614.

(51) Int. Cl.
| | |
|---|---|
| *G06F 3/06* | (2006.01) |
| *G06F 12/0866* | (2016.01) |
| *G06F 12/02* | (2006.01) |
| *G06F 17/30* | (2006.01) |

(52) U.S. Cl.
CPC ............ *G06F 3/0619* (2013.01); *G06F 3/064* (2013.01); *G06F 3/067* (2013.01); *G06F 3/0656* (2013.01); *G06F 3/0665* (2013.01); *G06F 3/0689* (2013.01); *G06F 12/023* (2013.01);

(Continued)

(58) Field of Classification Search
CPC .............. G06F 12/023; G06F 12/0866; G06F 17/30067
See application file for complete search history.

(56) References Cited

U.S. PATENT DOCUMENTS

| | | | |
|---|---|---|---|
| 5,577,212 A | 11/1996 | Russ | |
| 6,571,259 B1 * | 5/2003 | Zheng | ............... G06F 17/30067 |
| 2009/0327368 A1 | 12/2009 | Aston et al. | |

(Continued)

OTHER PUBLICATIONS

Office Action mailed Aug. 19, 2013, for related U.S. Appl. No. 13/334,871, filed Dec. 22, 201, 19 pages.

(Continued)

*Primary Examiner* — Edward Dudek, Jr.
*Assistant Examiner* — Andrew Russell
(74) *Attorney, Agent, or Firm* — Nixon Peabody, LLP; Khaled Shami

(57) ABSTRACT

A modular block allocator receives a cleaner message requesting dirty buffers associated with an inode be cleaned. The modular block allocator provides at least one bucket cache comprising a plurality of buckets, wherein each bucket represents a plurality of free data blocks. The dirty buffers are cleaned by allocating the data blocks of one of the buckets to the dirty buffers. The allocated data blocks are mapped to a stripe set and when the stripe set is full, the stripe set is sent to a storage system. In one embodiment of the invention, a modular block allocator includes a front end module and a back end module communicating with each other via an application programming interface (API). The front end module contains write allocation policies that define how blocks are laid out on disk. The back end module creates data structures for execution of the policies.

15 Claims, 7 Drawing Sheets

(52) U.S. Cl.
 CPC .... *G06F 12/0866* (2013.01); *G06F 17/30067* (2013.01); *G06F 17/30132* (2013.01)

(56) References Cited

U.S. PATENT DOCUMENTS

2010/0217941 A1    8/2010  Scobie
2011/0022570 A1*   1/2011  Hitz ..................... G06F 3/0613
                                                          707/661

OTHER PUBLICATIONS

Office Action mailed Mar. 6, 2014, for related U.S. Appl. No. 13/334,871, filed Dec. 22, 2011, 23 pages.
Office Action mailed Oct. 2, 2014, for related U.S. Appl. No. 13/334,871, filed Dec. 22, 2011, 20 pages.
Notice of Allowance mailed Apr. 20, 2015, for related U.S. Appl. No. 13/334,871, filed Dec. 22, 2011, 8 pages.
Corrected Notice of Allowability mailed Jul. 30, 2015, for related U.S. Appl. No. 13/334,871, filed Dec. 22, 2011, 5 pages.
Hollander, Andrew J., "Patenting Computer Data Structures: The Ghost, The Machine and The Federal Circuit," 2 Duke Law & Technology Review 1-12 (2003). Tagged as "A022 NPL Hollander Data Structures."

* cited by examiner

MODULAR BLOCK-ALLOCATOR FOR DATA STORAGE SYSTEMS

TECHNICAL FIELD

This invention relates to data storage systems and, more specifically, to a modular block allocator for a write anywhere file system.

BACKGROUND OF THE INVENTION

The creation and storage of digitized data has proliferated in recent years. Accordingly, techniques and mechanisms that facilitate efficient and cost effective storage of large amounts of digital data are common today. For example, a cluster network environment of nodes may be implemented as a data storage system to facilitate the creation, storage, retrieval, and/or processing of digital data. Such a data storage system may be implemented using a variety of storage architectures, such as a network-attached storage (NAS) environment, a storage area network (SAN), a direct-attached storage environment, and combinations thereof. The foregoing data storage systems may comprise one or more data storage devices configured to store digital data within data volumes.

A data storage system includes one or more storage devices. A storage device may be a disk drive organized as a disk array. Although the term "disk" often refers to a magnetic storage device, in this context a disk may, for example, be a hard disk drive (HDD) or a solid state drive (SSD).

In a data storage system, information is stored on physical disks as volumes that define a logical arrangement of disk space. The disks in a volume may be operated as a Redundant Array of Independent Disks (RAID). The RAID configuration enhances the reliability of data storage by the redundant writing of data stripes across a given number of physical disks in a RAID group and the storing of redundant information (parity) of the data stripes. The physical disks in a RAID group may include data disks and parity disks. The parity may be retrieved to recover data when a disk fails.

Information on disks is typically organized in a file system, which is a hierarchical structure of directories, files and data blocks. A file may be implemented as a set of data blocks configured to store the actual data. The data blocks are organized within a volume block number (VBN) space maintained by the file system. The file system may also assign each data block in the file a corresponding file block number (FBN). The file system assigns sequences of FBNs on a per-file basis, while VBNs are assigned over a large volume address space. The file system generally comprises contiguous VBNs from zero to N−1, for a file system of size N blocks.

An example of a file system is a write-anywhere file system that does not overwrite data on disks. Instead a data block is retrieved from a disk into a memory and is updated or modified (i.e., dirtied) with new data, the data block is thereafter written to a new location on the disk. A write-anywhere file system may initially assume an optimal layout such that the data is substantially contiguously arranged on disks, which results in efficient read operation. When accessing a block of a file in response to a request, the file system specifies a VBN that is translated into a disk block number (DBN) location on a particular disk within a RAID group. Since each block in the VBN space and in the DBN space is typically fixed (e.g., 4 K bytes) in size, there is typically a one-to-one mapping between the information stored on the disks in the DBN space and the information organized by the file system in the VBN space. The requested block is then retrieved from the disk and stored in a buffer cache of the memory as part of a buffer tree of the file. The buffer tree is an internal representation of blocks for a file stored in the buffer cache and maintained by the file system.

As discussed before, the requested data block is retrieved from the disk and stored in a buffer cache of the memory. If the data block is updated or modified by a CPU, the dirty data remains in the buffer cache. Multiple modifying operations by the CPU are cached before the dirty data is stored on the disk (i.e., the buffer is cleaned). The delayed sending of dirty data to the disk provides benefits such as amortized overhead of allocation and improved on-disk layout by grouping related data blocks together. In the write anywhere file system, the point in time when a collection of changes to the data blocks is sent to the disk is known as consistency point (CP). A CP may conceptually be considered a point-in-time image of the updates to the file system since the previous CP. The process of emptying the buffer cache by sending the dirty data to the disk is accomplished by collecting a list of inodes that have been modified since the last CP and then cleaning the inodes. It will be appreciated that cleaning dirty buffers involve assigning new locations on disk for the dirty buffers and then flushing the buffers to those locations on disk. An inode is a data structure used to store information, such as metadata, about a file, whereas data blocks are data structures used to store the actual data for the file. The information in an inode may include ownership of the file, access permission for the file, size of the file, and file type and references to locations on disk of the data blocks for the file. The references to the locations of the file data are provided by pointers which may reference the data blocks.

Initially a CPU issues a cleaner message indicating that the dirty buffers of one or more inodes need to be allocated on disk. In response, a block allocator in the file system selects free blocks on disks to which to write the dirty data and then queues the dirty buffers to a RAID group for storage. The block allocator examines a block allocation bitmap to select free blocks within the VBN space of a logical volume. The selected blocks are generally at consecutive locations on the disks in a RAID group for a plurality of blocks belonging to a particular file. When allocating blocks, the file system traverses a few blocks of each disk to lay down a plurality of stripes per RAID group. In particular, the file system chooses VBNs that are on the same stripe per RAID group to avoid RAID parity reads from disk.

In a cluster network environment having a plurality of multi-processors (MPs), multiple cleaner messages may be executing concurrently on MPs. The block allocator of the file system is required to respond to the multiple cleaner messages by selecting free blocks on disks on a RAID group and then queuing dirty buffers to the RAID group for writing. With new hardware platforms providing increasing number of CPUs, it becomes difficult for existing block allocators to timely respond to the cleaner messages, thus resulting in processing delay. Also, for efficient utilization of storage resources, depending on the particular type of data it is to store the data in a specific type of disk or a specific location on disk. For example, if a particular data block is frequently accessed, it is advantageous to store the data block in a SSD or the outer cylinder of an HDD for quick retrieval. If, on the other hand, the data is not frequently accessed, it may be acceptable to store the data block in the inner cylinder of an HDD. Many existing block allocators do not allow a user to select the type of disk or a location on disk to write the dirty buffers

BRIEF SUMMARY OF THE INVENTION

The present invention is directed to a modular block allocator having a plurality of modules at least one of which contains algorithms for write allocation policies and at least another of which creates data structures for execution of the policies and determination of a storage media type. In one embodiment of the invention, the modular block allocator includes a front end module and a back end module communicating with each other via an application programming interface (API). The front end module contains write allocation policies that define how cleaner messages are serviced. The back end module creates data structures for execution of the policies.

In one embodiment of the invention, a method includes providing at least one bucket cache having a plurality of buckets. Each bucket represents a plurality of free data blocks. In one embodiment, a free data block is a free volume block number (VBN) of a file system. The method according to the embodiment also includes receiving a cleaner message requesting dirty buffers associated with an inode be allocated on disks. The process of allocating dirty buffers on disks is also referred to in this document as cleaning dirty buffers. The dirty buffers are cleaned by allocating or assigning the free VBNs of one of the buckets to the dirty buffers. The free VBNs map to data block numbers (DBNs) on a storage media and are identified from a bitmap associated with the storage media. In one embodiment, the storage media comprises one or more RAID groups. According to the embodiment, the method includes mapping the allocated VBNs to a stripe set. When the stripe set is full, the entire stripe set is sent to the RAID groups for storage.

In one embodiment, the bucket cache includes buckets having attributes indicating that the associated VBNs map to a specific type of storage media or to a specific location of a storage media. In response to a cleaner message requesting that data in the dirty buffers be stored on a specific type of storage media or on a specific location of a storage media, a bucket cache having the attribute is assigned to service that cleaner message. The bucket cache also includes default buckets which do not contain any attributes. The default buckets are assigned to service cleaner messages that do not contain special attribute requests.

In one embodiment, the system includes a front end module configured to receive a cleaner message requesting dirty buffers associated with an inode be cleaned. The system according to the embodiment also includes a back end module for providing at least one bucket cache comprising a plurality of buckets, wherein each bucket represents a set of free volume block numbers (VBNs). The system according to the embodiment also includes an application programming interface operable to obtain the buckets from the back end module and to provide the buckets to the front end module. The dirty buffers are cleaned by allocating the VBNs of one of the buckets to the dirty buffers. The allocated VBNs are mapped to a stripe set. When the stripe set is full, the stripe set is sent to the RAID groups for storage.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
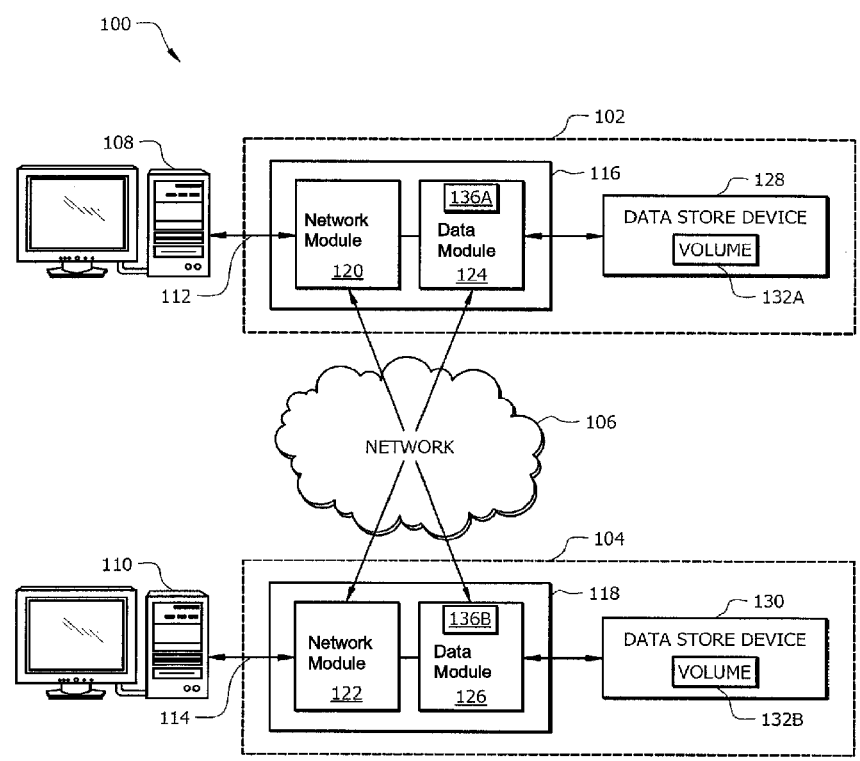
FIG. 1 is a block diagram of a system adapted according to one embodiment of the invention to provide a modular block allocator.

FIG. 1 shows a block diagram of a system adapted according to embodiments of the invention to provide a modular block allocator for data storage systems. System 100 of FIG. 1 comprises an exemplary clustered network environment in which data storage systems 102 and 104 are coupled via a network 106. Data storage systems 102 and 104 work together to provide the clustered network environment. Data storage systems 102 and 104 of embodiments may comprise one or more modules, components, etc. operable to provide operation as described herein. For example, data storage systems 102 and 104 of the illustrated embodiment comprise nodes 116 and 118 and data store devices 128 and 130, respectively. It should be appreciated that the nodes and/or data store devices of the data storage systems 102 and 104 may themselves comprise one or more modules, components, etc. Nodes 116 and 118 of the illustrated embodiment comprise network modules (referred to herein as "N-Modules") 120 and 122 and data modules (referred to herein as "D-Modules") 124 and 126, respectively. Data store devices 128 and 130 of the illustrated embodiment comprise volumes 132A and 132B of user and/or other data, respectively.

The modules, components, etc. of data storage systems 102 and 104 may comprise various configurations suitable for providing operation as described herein. For example, nodes 116 and 118 may comprise processor-based systems, such as file server systems, computer appliances, computer workstations, etc. Accordingly, nodes 116 and 118 of embodiments comprise a processor (e.g., central processing unit (CPU), application specific integrated circuit (ASIC), programmable gate array (PGA), etc.), memory (e.g., random access memory (RAM), read only memory (ROM), disk memory, optical memory, flash memory, etc.), and suitable input/output circuitry (e.g., network interface card (NIC), wireless network interface, display, keyboard, data bus, etc.). The foregoing processor-based systems may operate under control of an instruction set (e.g., software, firmware, applet, code, etc.) providing operation as described herein.

Data store devices 128 and 130 may, for example, comprise disk memory, flash memory, optical memory, and/or other suitable computer readable media. It will be apparent to those skilled in the art that data store devices 128 and 130 may comprise one or more RAID groups.

In one embodiment, modular block allocator 136A resides in data module 124 and modular block allocator 136B resides in the data module 126. As will be explained later, modular block allocators 136A and 136B responsive to a plurality of cleaner messages executing concurrently on multiple processors clean dirty buffers associated with inodes. Data modules 124 and 126 of nodes 116 and 118 may be adapted to communicate with data store devices 128 and 130 according to a storage area network (SAN) protocol (e.g., small computer system interface (SCSI), fiber channel protocol (FCP), INFINIBAND, etc.) and thus data store devices 128 and 130 may appear a locally attached resources to the operating system. That is, as seen from an operating system on nodes 116 and 118, data store devices 128 and 130 may appear as locally attached to the operating system. In this manner, nodes 116 and 118 may access data blocks through the operating system, rather than expressly requesting abstract files.

Network modules 120 and 122 may be configured to allow nodes 116 and 118 to connect with client systems, such as clients 108 and 110 over network connections 112 and 114, to allow the clients to access data stored in data storage systems 102 and 104. Moreover, network modules 120 and 122 may provide connections with one or more other components of system 100, such as through network 106. For example, network module 120 of node 116 may access data store device 130 via communication network 106 and data module 126 of node 118. The foregoing operation provides a distributed storage system configuration for system 100.

Clients 108 and 110 of embodiments comprise a processor (e.g., CPU, ASIC, PGA, etc.), memory (e.g., RAM, ROM, disk memory, optical memory, flash memory, etc.), and suitable input/output circuitry (e.g., NIC, wireless network interface, display, keyboard, data bus, etc.). The foregoing processor-based systems may operate under control of an instruction set (e.g., software, firmware, applet, code, etc.) providing operation as described herein.

Network 106 may comprise various forms of communication infrastructure, such as a SAN, the Internet, the public switched telephone network (PSTN), a local area network (LAN), a metropolitan area network (MAN), a wide area network (WAN), a wireless network (e.g., a cellular communication network, a wireless LAN, etc.), and/or the like. Network 106, or a portion thereof may provide infrastructure of network connections 112 and 114 or, alternatively, network connections 112 and/or 114 may be provided by network infrastructure separate from network 106, wherein such separate network infrastructure may itself comprise a SAN, the Internet, the PSTN, a LAN, a MAN, a WAN, a wireless network, and/or the like.

Figure 2:
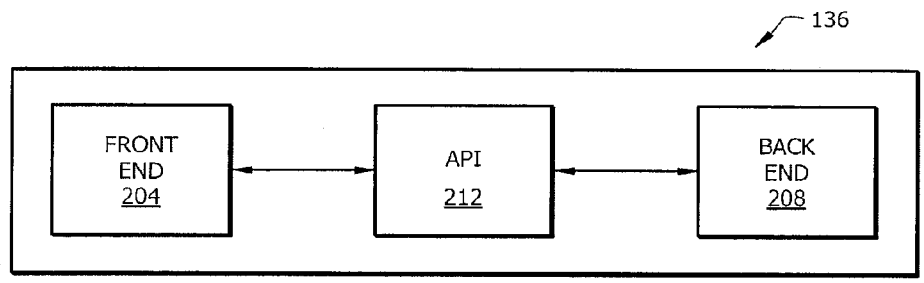
FIG. 2 illustrates a the modular block allocator in accordance with one embodiment of the invention.

FIG. 2 illustrates modular block allocator 136 in accordance with one embodiment of the invention. Modular block allocator 136 includes front end module 204 and back end module 208 communicating with each another via application programming interface (API) 212. Front end module 204 contains algorithms for write allocation policies while back end module 208 executes the policies and manages a write allocation infrastructure including selection of storage media type. By separating the algorithms for write allocation policies from the write allocation infrastructure, aspects of the invention provide an architecture that scales with increasing number of processors. Also, any changes to the write allocation policies may be implemented by modifying the algorithms in front end module 204 without a need to modify back end module 208.

Figure 3A:
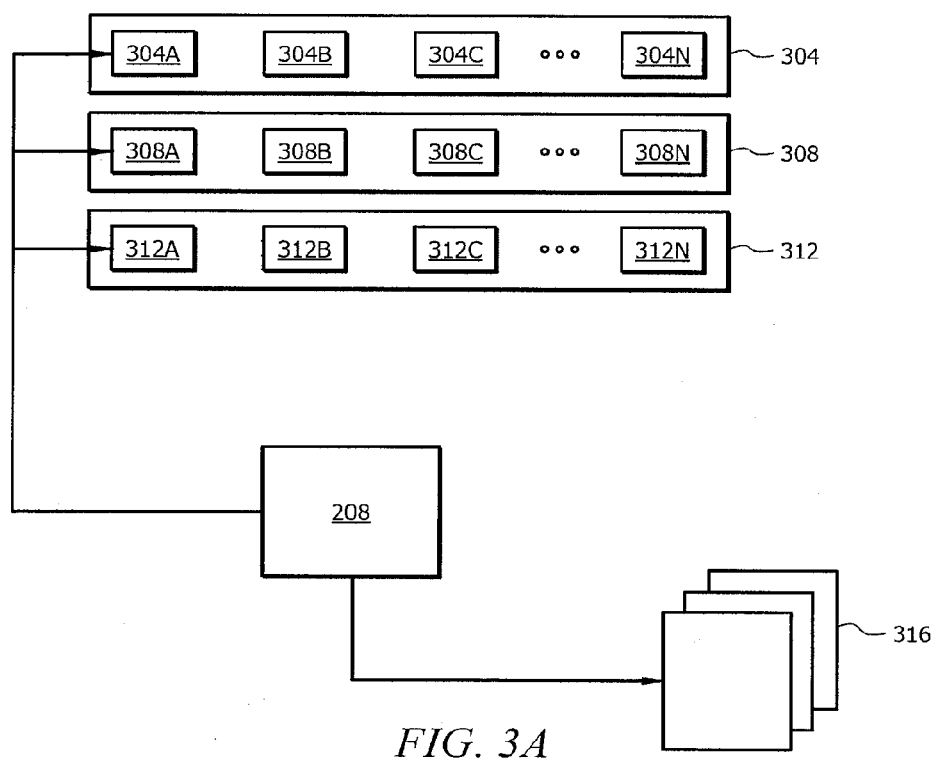
FIG. 3A illustrates a plurality of bucket caches.

FIG. 3A illustrates aspects of the invention in more detail. In one embodiment, back end module 208 creates a plurality of bucket caches 304, 308, and 312. By way of example, bucket caches 304, 308 and 312 contain buckets 304A-304N, 308A-308N, and 312A-312N, respectively. A bucket is a data structure which contains a plurality of data blocks in a file system wherein the plurality of data blocks includes a contiguous set of free data blocks. In accordance with embodiments of the invention, the threshold number of contiguous free data blocks is at least one half the data blocks of the bucket. For example, buckets may comprise a number of data blocks which is twice a predetermined write allocation unit (also referred to as write allocation chunk), such that a bucket includes at least one write allocation unit of contiguous free data blocks. Having one write allocation unit worth of contiguous VBNs allows a block allocator to allocate up to write allocation chunk consecutive FBNs of an inode on consecutive DBNs on disk. Laying out consecutive FBNs of a file on sequential DBNs of a disk ensures good sequential read performance. In one embodiment of the invention, a bucket contains a starting VBN, bitmasks representing available VBNs and bitmasks representing used VBNs. Block allocator 136 cleans dirty buffers by allocating the VBNs in the buckets to the dirty buffers. Back end module 208 creates the buckets from the free VBNs by selecting free blocks on disks in one or more RAID groups. Back end module 208 examines bitmap 316 associated with the RAID groups to select free blocks. The selected blocks are generally at the same location (e.g., same DBNs) on disks of the RAID groups. The buckets are formed from the selected blocks and are queued by back end module 208 to form bucket caches 304, 308, and 312.

In one embodiment of the invention, bucket caches 304, 308, and 312 may include default bucket caches as well as bucket caches having special attributes. By way of example, a bucket cache having special attributes contains buckets from a specific type of storage media (e.g., SSD, HDD, DASD, etc.), buckets from a specific location on a storage media (e.g., inner cylinder of HDD or outer cylinder of HDD), etc. It will be understood by those skilled in the art that a bucket cache of embodiments may contain buckets from any other type of storage media. A default bucket cache contains buckets without special attributes. By way of example, bucket cache 304 may be a default bucket cache while bucket caches 308 and 312 may have special attributes. In response to a cleaner message indicating that data in dirty buffers needs to written to a specific type of storage media or a specific location on a storage media, a bucket having the appropriate special attribute is provided to the front end 204 to service the cleaner message. If the cleaner message does not request for any specific attribute, a bucket from a default bucket cache is provided to the front end module 204.

In some embodiments of the invention, back end module 208 keeps a plurality of bucket caches readily available. Consequently, back end module 208 is able to promptly respond to requests for buckets from front end module 204.

Figure 3B:
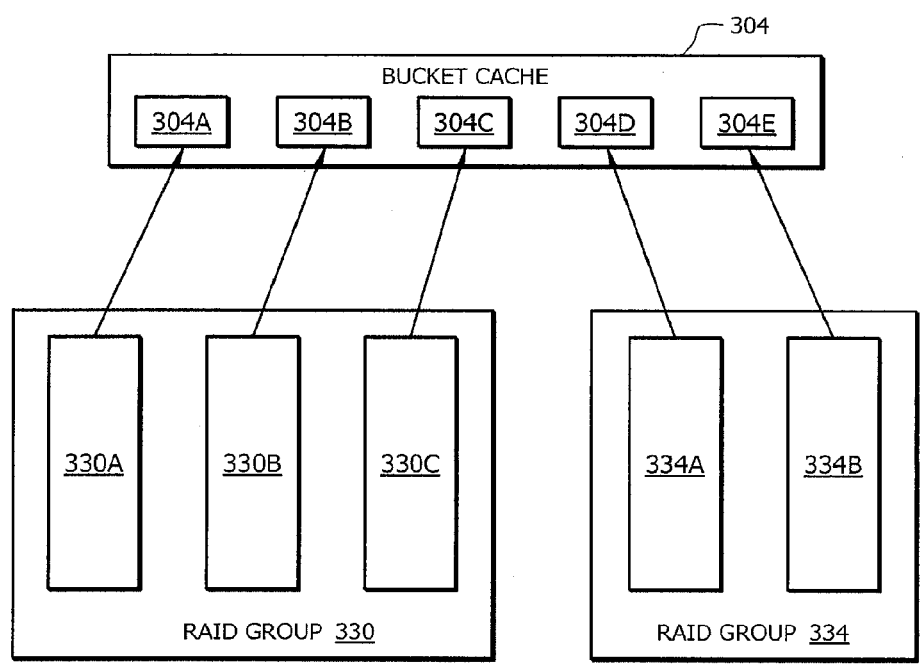
FIG. 3B illustrates the formation of a bucket cache from two RAID groups.

FIG. 3B illustrates the formation of one of the bucket caches (e.g., bucket cache 304) in accordance with one embodiment of the invention. As shown in FIG. 3B, RAID groups 330 and 334 include disks 330A-330C and 334A, 334B, respectively. In one embodiment of the invention, each disk in a RAID group contributes to the formation of one bucket in a bucket cache. Accordingly, disks 330A, 330B and 330C in the RAID group 330 contribute to the formation of buckets 304A, 304B and 304C, respectively, in bucket cache 304. Similarly, disks 334A and 334B in RAID group 334 contribute to the formation of buckets 304D and 304E, respectively, in bucket cache 304.

Figure 4:
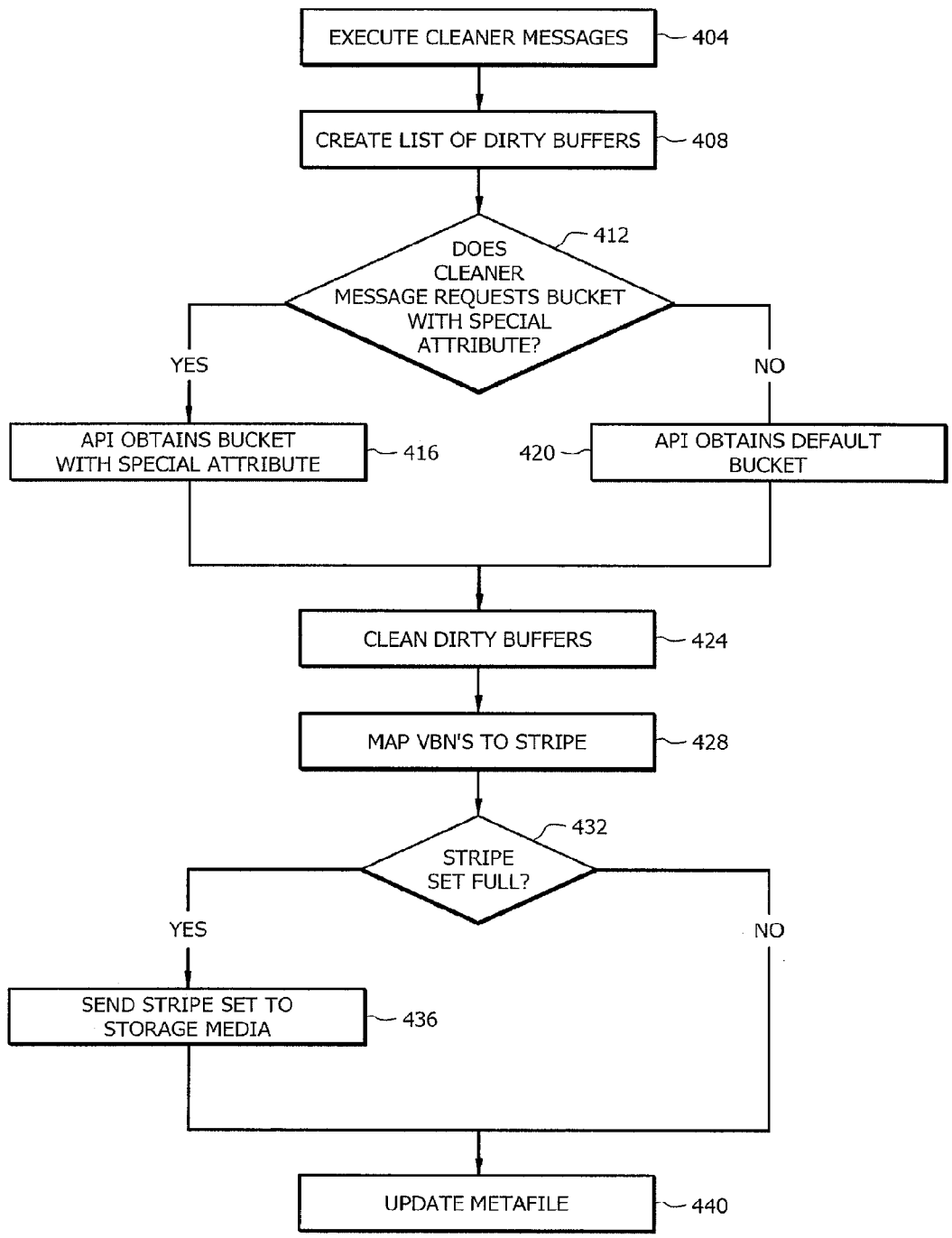
FIG. 4 is a flow diagram of method steps in accordance with one embodiment of the invention.

FIG. 4 is a flow diagram of method steps in accordance with one embodiment of the invention. In step 404, multiple cleaner messages execute on multiple processors within block allocator 136. A cleaner message indicates that dirty buffers of an inode needs to be cleaned. Responsive to the cleaner messages, in step 408 front end module 204 of block allocator 136 assembles a list of dirty buffers of the inodes that need to be cleaned.

In decision block 412, front end module 204 determines if a cleaner message has requested a bucket having a special attribute. If yes, in step 416, API 212 obtains a bucket having the special attribute and provides the bucket to front end module 204. Otherwise, API 212 obtains a default bucket and provides the bucket to front end module 212.

In step 424, front end module 204 services the cleaner message by cleaning the associated dirty buffers by allocating the VBNs of the bucket to the dirty buffers. Thus, the dirty buffers are tagged to the VBNs.

In step 428 the allocated VBNs are mapped to a stripe set. In step 432, a determination is made whether the stripe set is full. If yes, in step 436, a full stripe set is sent to the RAID groups by back end module 208 for storage. In step 440, back end module 208 updates the meta data of the file system including the filesystem bitmaps to reflect that the VBNs in the bucket have been used. If in step 432, it is determined that the stripe set is not full, the flow moves to step 440.

In one embodiment of the invention, if less than a predetermined percentage VBNs in the bucket are tagged, the bucket is returned to the bucket cache for further use. Consider, for example, that after tagging dirty buffers associated with a particular cleaner message to VBNs of a bucket, more than half of the available VBNs of the bucket are still available. In that case, the bucket will be returned to the bucket cache so that it may be used to service another cleaner message. In one embodiment of the invention, if at least one write allocation chunk or unit of VBNs are still available after a bucket has been used to service a cleaner message, the bucket is returned to the bucket cache so that it may be used to service another cleaner message. The write allocation chunk is a predetermined number of VBNs and may vary depending on the configuration.

Figure 5A:
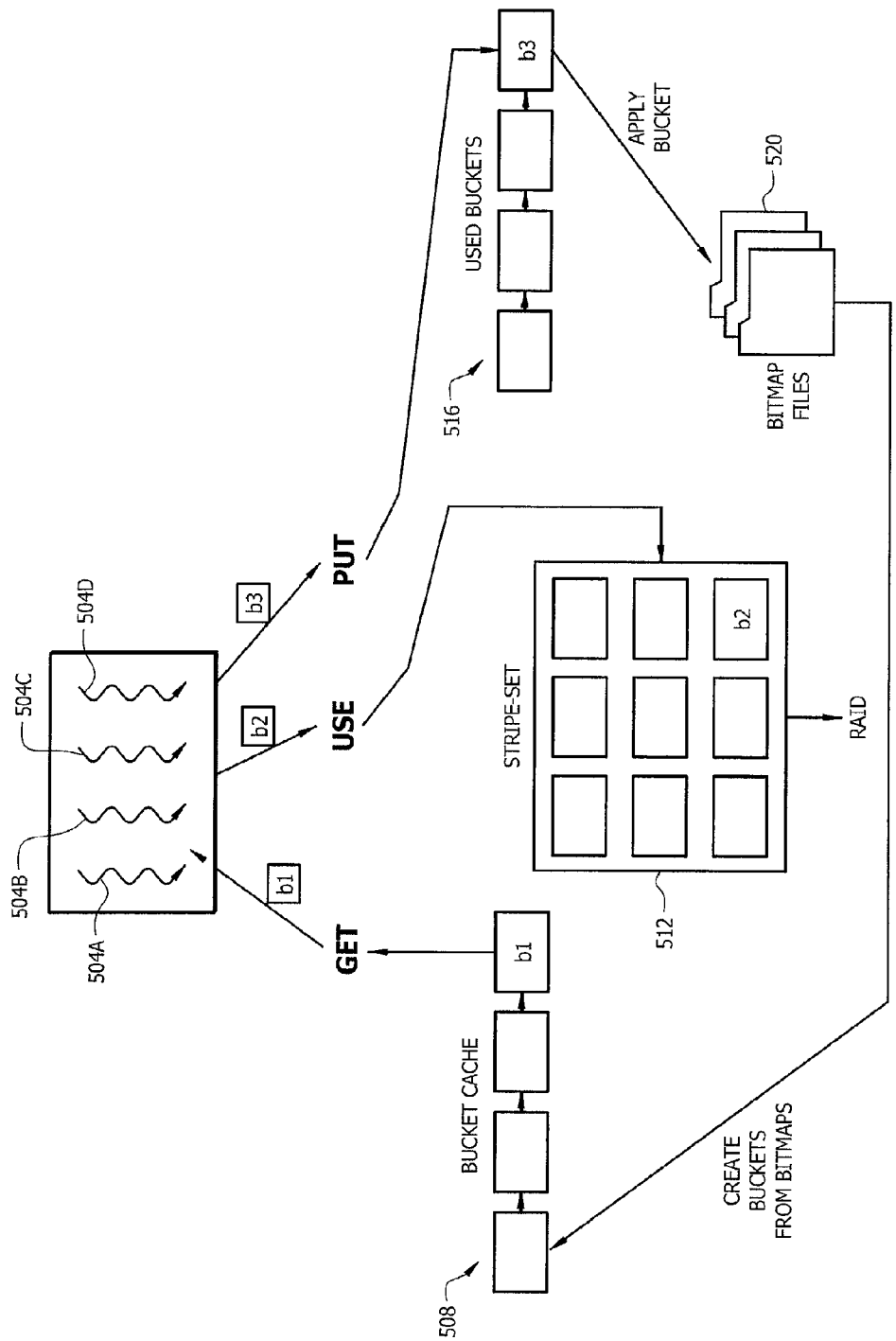
FIG. 5A illustrates multiple buckets in various stages of being processed in accordance with one embodiment of the invention.
Figure 5B:
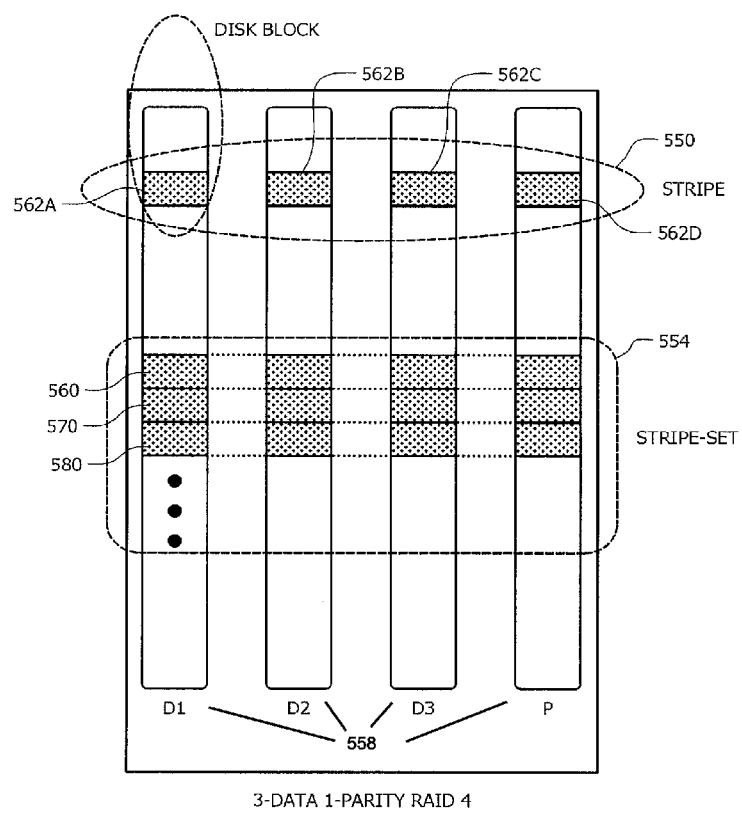
FIG. 5B illustrates a stripe and a stripe set in accordance with one embodiment of the invention.

FIG. 5A illustrates multiple buckets in various stages of being processed in accordance with embodiments of the invention. As shown in FIG. 5A, plurality of cleaner messages 540A, 504B, 504C and 504D are executing on multiple processors. Bucket cache 508 which includes a plurality of buckets is made readily available to service the cleaner messages. One of the buckets b1 in bucket cache 508 is being shown retrieved (by invoking API GET) to clean dirty buffers associated with one of the cleaner messages. FIG. 5A also shows a second bucket b2 that has already been used (by invoking API USE) to clean dirty buffers associated with one of the cleaner messages. The VBNs associated with bucket b2 is mapped to stripe set 512 in order to be written to disks. Also shown is a third bucket b3 that has been used and is queued into used bucket 516 cache (by invoking API PUT). After bucket b3 is queued into used bucket cache 512, bitmap 520 is updated. FIG. 5B illustrates an exemplary stripe 550 and stripe set 554 formed on RAID group 558. It will be appreciated that the term "stripe" generally refers to a collection of blocks with the same DBN on each disk of a storage system such as, for example, a RAID group. Referring to FIG. 5B, RAID group 558 comprises data disks D1, D2, D3 and parity disk P. Blocks 562A, 562B, 562C and 562D from respective disks D1, D2, D3 and P are used in stripe 550. As shown in FIG. 5B, stripe set 554 includes stripes 560, 570 and 580.

In one embodiment of the invention, responsive to a cleaner message indicating that data in a dirty buffer needs to written to a specific type of storage media or a specific location on a storage media, front end module 204 may attach one or more attributes to the request for buckets. A cleaner message, for example, may indicate that the data in the dirty buffer needs to be written to an outer cylinder of an HDD. It will be understood by those skilled in the art that if data is frequently accessed, the data should preferably be written to an outer cylinder of an HDD or to an SSD so that the data may subsequently read quickly. In response to the cleaner message, front end module 204 attaches an attribute to a bucket request specifying an outer cylinder of HDD. API 212 then obtains a bucket having a special attribute and provides the bucket to front end module 204. API 212, for example, may provide bucket 308A from bucket cache 308 because buckets 308A-308N contain special attributes. If a bucket request from the front end module 204 does not contain any attributes, a bucket from a default bucket cache is provided to the front end module 204. In that case, bucket 304A may be provided to front end module 204 because buckets in bucket cache 304 are default buckets.

Figure 6:
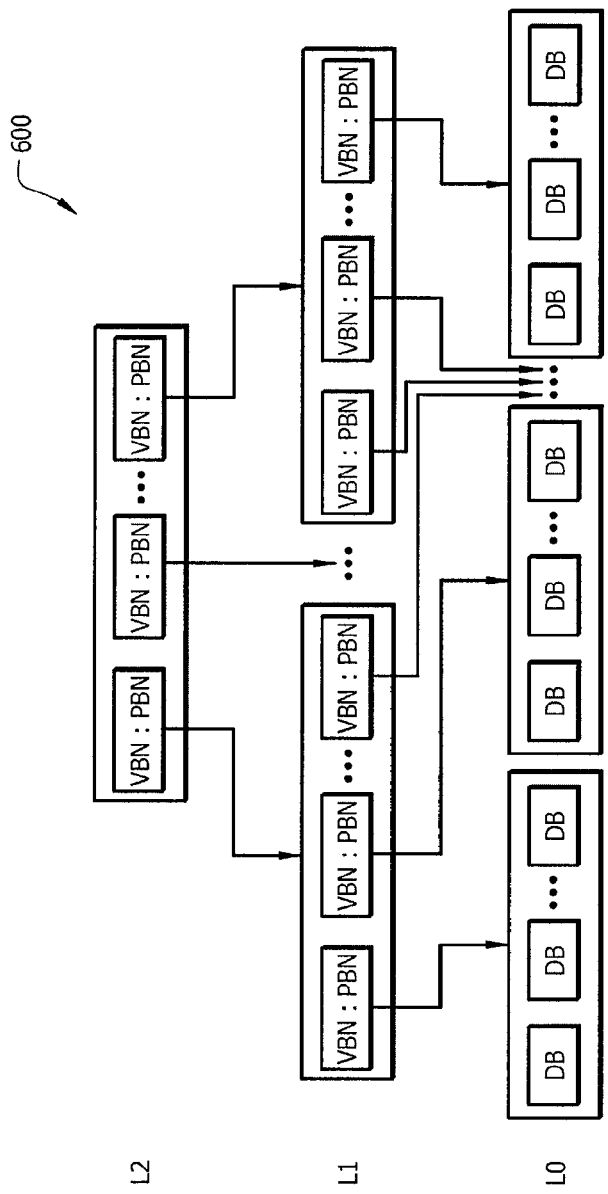
FIG. 6 illustrates a hierarchical buffer tree.

In one aspect of the invention, a filesystem organizes the dirty buffers of an mode in a hierarchical buffer tree 600 as illustrated in FIG. 6. In buffer tree 600, buffers in level L0 comprise the ultimate data (e.g., user data, application data, etc.) and thus provide a data level. Levels L1 and L2 of buffer tree 600 comprise buffers that provide information with respect to other buffers, wherein buffers of level 2 provide information identifying buffers of level 1 and buffers of level 1 provide information identifying buffers of level 0. In accordance with some embodiments, front end module first cleans buffers in L0, then L1s, L2s and so on until the inode is reached. While allocating buffers in L0s, back end module lays out write-allocation-chunk sized consecutive dirty FBNS of a file on consecutive DBNS of a disk, thus ensuring good read performance on a subsequent read of these blocks. Thereafter, back end module switches to another disk in order to allocates. While allocating buffers in L1s, L2s etc., back end module may allocate multiple levels of buffers on a single disk, or switch to a different disk for every buffer depending on policy. By switching to a different disk, full stripes can be written thus eliminating the need to read blocks from the disk to compute parity.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for modular block allocation, the method comprising:
    identifying, by a data storage computing device, one or more dirty buffers to be cleaned in response to a received cleaner message identifying one or more index nodes associated with the dirty buffers, wherein the cleaner message comprises at least one of a specific type of storage medium or a specific location on the storage medium to which data in the dirty buffers is to be written;
    allocating, by the data storage computing device, one or more volume block numbers (VBNs) of a file system to the dirty buffers, wherein the VBNs correspond to one or more free data blocks of a bucket in a bucket cache;
    mapping, by the data storage computing device, the VBNs to a stripe set and determining when the stripe set is full; and
    sending, by the data storage computing device, the stripe set to one or more RAID groups and updating metadata of the file system to indicate that the VBNs allocated to the free data blocks of the bucket have been used, when the determining indicates the stripe set is full.

2. The method of claim 1, wherein the bucket is selected based on the indication, and the free data blocks are mapped to the specific type of storage medium.

3. The method of claim 1, wherein the bucket cache comprises a plurality of buckets including the bucket and at least a subset of the buckets are default buckets that do not comprise any special attributes and another subset of the buckets comprise one or more special attributes.

4. The method of claim 1, wherein the VBNs correspond to disk block numbers (DBNs) on a storage medium, the DBNs are identified from a bitmap associated with the storage medium, and the VBNs comprise one or more write allocation chunks of contiguous VBNs.

5. The method of claim 1, further comprising:
    identifying, by the data storage computing device, the VBNs as corresponding to the free data blocks from a bitmap associated with a storage medium; and
    creating, by the data storage computing device, the bucket to include the free data blocks to which the VBNs correspond based on the identifying.

6. A non-transitory computer readable medium having stored thereon instructions for modular block allocation comprising executable code which when executed by a processor, causes the processor to perform steps comprising:
    identifying one or more dirty buffers to be cleaned in response to a received cleaner message identifying one or more index nodes associated with the dirty buffers, wherein the cleaner message comprises at least one of a specific type of storage medium or a specific location on the storage medium to which data in the dirty buffers is to be written;
    allocating one or more volume block numbers (VBNs) of a file system to the dirty buffers, wherein the VBNs correspond to one or more free data blocks of a bucket in a bucket cache;
    mapping the VBNs to a stripe set and determining when the stripe set is full; and
    sending the stripe set to one or more RAID groups and updating metadata of the file system to indicate that the VBNs allocated to the free data blocks of the bucket have been used, when the determining indicates the stripe set is full.

7. The non-transitory computer readable medium as set forth in claim 6, wherein the bucket is selected based on the indication, and the free data blocks are mapped to the specific type of storage medium.

8. The non-transitory computer readable medium as set forth in claim 6, wherein the bucket cache comprises a plurality of buckets including the bucket and at least a subset of the buckets are default buckets that do not comprise any special attributes and another subset of the buckets comprise one or more special attributes.

9. The non-transitory computer readable medium as set forth in claim 6, wherein the VBNs correspond to disk block numbers (DBNs) on a storage medium, the DBNs are identified from a bitmap associated with the storage medium, and the VBNs comprise one or more write allocation chunks of contiguous VBNs.

10. The non-transitory computer readable medium as set forth in claim 6, further having stored thereon at least one additional instruction comprising executable code which when executed by the processor, causes the processor to perform at least one additional step comprising:
    identifying the VBNs as being allocated to the free data blocks from a bitmap associated with a storage medium; and
    creating the bucket to include the free data blocks to which the VBNs correspond based on the identifying.

11. A data storage computing device, comprising a processor and a memory coupled to the processor which is configured to execute programmed instructions stored in the memory, the instructions comprising:
    identify one or more dirty buffers to be cleaned in response to a received cleaner message identifying one or more index nodes associated with the dirty buffers, wherein the cleaner message comprises at least one of a specific type of storage medium or a specific location on the storage medium to which data in the dirty buffers is to be written;
    allocate one or more volume block numbers (VBNs) of a file system to the dirty buffers, wherein the VBNs correspond to one or more free data blocks of a bucket in a bucket cache;
    map the VBNs to a stripe set and determine when the stripe set is full; and
    send the stripe set to one or more RAID groups and update metadata of the file system to indicate that the VBNs allocated to the free data blocks of the bucket have been used, when the determining indicates the stripe set is full.

12. The data storage computing device as set forth in claim 11, wherein the bucket is selected based on the indication, and the free data blocks are mapped to the specific type of storage medium.

13. The data storage computing device as set forth in claim 11, wherein the bucket cache comprises a plurality of buckets including the bucket and at least a subset of the buckets are default buckets that do not comprise any special attributes and another subset of the buckets comprise one or more special attributes.

14. The data storage computing device as set forth in claim 11, wherein the VBNs correspond to disk block numbers (DBNs) on a storage medium, the DBNs are identified from a bitmap associated with the storage medium, and the VBNs comprise one or more write allocation chunks of contiguous VBNs.

15. The data storage computing device as set forth in claim 11, wherein the processor is further configured to be capable of executing at least one additional programmed instruction comprising and stored in the memory, the instructions comprising:
- identify the VBNs as being allocated to the free data blocks from a bitmap associated with a storage medium; and
- create the bucket to include the free data blocks to which the VBNs correspond based on the identifying.

* * * * *